United States Patent
Park et al.

(10) Patent No.: US 11,912,245 B2
(45) Date of Patent: Feb. 27, 2024

(54) DEVICE FOR DISTRIBUTING WASHER FLUID IN VEHICLE

(71) Applicants: Hyundai Motor Company, Seoul (KR); Kia Motors Corporation, Seoul (KR); DY AUTO Corporation, Chungcheongnam-do (KR)

(72) Inventors: Jong Min Park, Seoul (KR); Nak Kyoung Kong, Gyeonggi-do (KR); Seung Sik Han, Gyeonggi-do (KR); Ki Hong Lee, Seoul (KR); Jong Wook Lee, Chungcheongnam-do (KR)

(73) Assignees: Hyundai Motor Company, Seoul (KR); Kia Motors Corporation, Seoul (KR); DY Auto Corporation, Chungcheongnam-do (KR)

( * ) Notice: Subject to any disclaimer, the term of this patent is extended or adjusted under 35 U.S.C. 154(b) by 687 days.

(21) Appl. No.: 17/094,015

(22) Filed: Nov. 10, 2020

(65) Prior Publication Data

US 2021/0380074 A1     Dec. 9, 2021

(30) Foreign Application Priority Data

Jun. 3, 2020  (KR) .......................... 10-2020-0066915

(51) Int. Cl.
*B60S 1/48*         (2006.01)

(52) U.S. Cl.
CPC .................................... *B60S 1/481* (2013.01)

(58) Field of Classification Search
CPC ........ B60S 1/481; B60S 1/603; B60S 1/0818; B60S 1/0896
See application file for complete search history.

(56) References Cited

U.S. PATENT DOCUMENTS

2020/0108801 A1*  4/2020  Frederick ................ B60S 1/481

FOREIGN PATENT DOCUMENTS

| KR | 10-2009-0047963 A | 5/2009 |
| WO | 2018/059793 A1 | 4/2018 |

* cited by examiner

*Primary Examiner* — Qingzhang Zhou
(74) *Attorney, Agent, or Firm* — Fox Rothschild LLP

(57) ABSTRACT

A device for distributing washer fluid, which includes a case including one or more discharge holes, a rail part located in the case, a pipe assembly moved along the rail part and configured to discharge a washer fluid to the one or more discharge holes, a motor assembly configured to apply a driving force to allow the pipe assembly to be moved along the rail part, a hose engaged with the pipe assembly and integrally moved with the pipe assembly along the rail part, and a controller configured to control the driving force of the motor assembly in response to a cleaning request such that the pipe assembly discharges the washer fluid to a selected discharge hole.

6 Claims, 4 Drawing Sheets

DEVICE FOR DISTRIBUTING WASHER FLUID IN VEHICLE

CROSS-REFERENCE TO RELATED APPLICATION

This application claims under 35 U.S.C. § 119(a) the benefit of Korean Patent Application No. 10-2020-0066915 filed on Jun. 3, 2020, the entire contents of which are incorporated herein by reference.

BACKGROUND

(a) Technical Field

The present disclosure relates to a device for distributing washer fluid in a vehicle, more particularly, to the device for distributing washer fluid that performs distribution of a washer fluid by moving a pipe assembly to a position corresponding to one selected discharge hole among a plurality of discharge holes included in an upper case.

(b) Description of the Related Art

Conventionally, there is a washer pump system mounted on a vehicle to selectively supply a washer fluid in a washer tank to a front windshield and a rear windshield.

Since surfaces of the front and rear windshields (also referred to interchangeably as "windshield") are frequently contaminated with foreign material such as dust and the like, in order to sufficiently secure a front view and achieve safe operation, the foreign material on the surfaces of the windshield should be removed.

As described above, in order to remove the foreign material and the like on the windshield of the vehicle, the vehicle is provided with a washer nozzle for spraying a washer fluid together with a wiper system.

Therefore, when a driver operates a washer switch installed in the vehicle so as to clear a field of view, a washer motor in conjunction with the washer switch operates, and the washer fluid stored in a washer fluid storage tank is sprayed to the windshield through the washer nozzle due to an operation of the washer motor. Through the sprayed washer fluid and a wiper operation, the foreign material obstructing the driver's view may be removed so that the driver can safely operate the vehicle in a state in which the field of view is secured.

However, in recent years, when pollutants are attached to various devices (a camera, radio detecting and ranging (RADAR), light detecting and ranging (LiDAR), and the like) which are coupled to an outer side of the vehicle for autonomous driving, there occurs a problem in measuring data for performing the autonomous driving. Stability of the vehicle is significantly threatened by such devices, which may be rendered useless such that it is impossible to measure data.

Therefore, a device for distributing washer fluid sprayed to various positions is indispensably required.

SUMMARY

In one aspect, the present disclosure provides a device for distributing washer fluid, which includes a plurality of flow paths through a single washer pump.

In another aspect, the present disclosure provides a device for distributing washer fluid, which includes a pipe assembly configured to correspond to a discharge hole and is capable of selectively distributing a washer fluid to a discharge hole fluidically connected to a device to which cleaning is requested.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

The device for distributing a washer fluid includes the following components.

In an exemplary embodiment, the present disclosure provides a device for distributing washer fluid, which includes a case having one or more discharge holes, a rail part located in the case, a pipe assembly moved along the rail part and configured to discharge a washer fluid to the one or more discharge holes, a motor assembly configured to apply a driving force to allow the pipe assembly to be moved along the rail part, a hose engaged with the pipe assembly and integrally moved with the pipe assembly along the rail part, and a controller configured to control the driving force of the motor assembly in response to a cleaning request such that the pipe assembly discharges the washer fluid through a selected discharge hole.

In addition, the pipe assembly may include a fixing part fixed to the rail part, a discharge portion located inside the fixing part and configured to protrude due to a hydraulic pressure, and an elastic member located between the discharge portion and the fixing part and configured to apply an elastic force to allow the protruding discharge portion to be restored.

In addition, the motor assembly may include a step motor located at a distal end of the rail part, and a gear part configured to transmit a rotating force of the step motor to allow the pipe assembly to be moved on the rail part.

In addition, in an initial state, the pipe assembly may be provided at a position corresponding to a central discharge hole among the plurality of discharge holes.

In addition, one end of the hose may be configured to be fluidically connected to a washer pump.

In addition, the rail part may include a sled to which the pipe assembly is fixed, a pinion gear which is located on a lower surface of the sled and to which a driving force of the motor assembly is applied, and a rail configured to move the pipe assembly.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
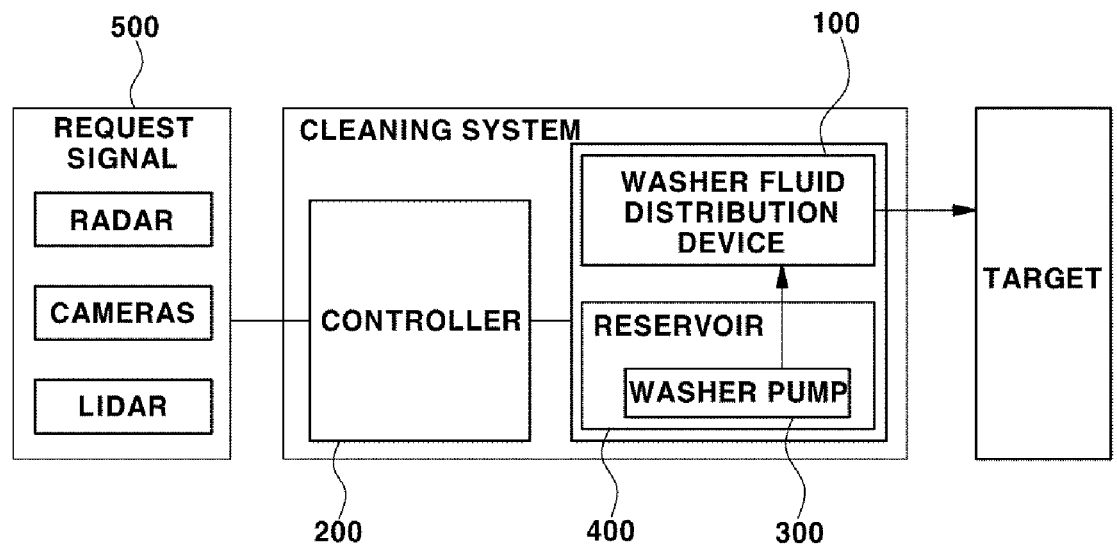
FIG. 1 is a block diagram illustrating a device for distributing a washer fluid according to one embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. The embodiments of the present disclosure can be modified in various forms, and the scope of the present invention should not be construed as being limited to the following embodiments. These embodiment are provided to more fully describe the present disclosure to those skilled in the art.

Further, the term "~part," "~assembly," "~motor," or the like used herein means a unit for processing at least one function or operation, and this unit may be implemented by hardware, software, or a combination of hardware and software.

The present disclosure relates to a washer fluid distribution device 100 and provides a technique for distributing a washer fluid to various external devices 500 located on an outer side of a vehicle and contaminated by pollutants.

According to one embodiment of the present disclosure, discharge holes 113 are configured to be connected to the external devices 500 located outside a vehicle, and a single discharge hole 113 is configured to be connected to a different external device 500.

The external devices 500 located outside the vehicle include a camera for providing one or more images among a front image, a rear image, and a side image of the vehicle, and a light detecting and ranging (LiDAR) and a radio detecting and ranging (RADAR) for receiving driving information.

The LiDAR controls the LiDAR device and other devices connected to the LiDAR device (e.g., a LiDAR processor (not shown) for processing a LiDAR sensing output). For example, such control includes power supply control, reset control, clock (CLK) control, data communication control, memory control, and the like. Meanwhile, the LiDAR device is used to sense a front area of the vehicle. Such a LiDAR device is located on a front surface inside the vehicle, specifically, below a front windshield to transmit and receive laser light through the front windshield.

In addition, for example, the RADAR is connected to a RADAR device which is a sensor. The RADAR device is a sensor device for measuring a distance, a speed, and an angle of an object using electromagnetic waves. When the RADAR device is used, an object in a front side up to 150 m in a horizontal angle of 30 degrees may be detected using a frequency modulation carrier wave (FMCW) method or a pulse carrier method. The RADAR controls the RADAR device and other devices connected to the RADAR device (e.g., a RADAR processor (not shown) for processing a RADAR sensing output).

As described above, when contaminants are attached to not only the camera but also the LiDAR and the RADAR, it is impossible to receive driving environment information in an autonomous driving condition of the vehicle so that a structure of a spray device capable of spraying a washer fluid onto each device is indispensably required.

FIG. 1 is a block diagram illustrating a coupling relationship of the washer fluid distribution device according to one embodiment of the present disclosure.

As shown in the drawing, the present disclosure includes a controller 200 which receives a user request and controls the washer fluid distribution device 100 on the basis of the received user request. The controller 200 is controlled to spray the washer fluid to the external device 500 to which cleaning is required on the basis of an input signal of a user or vehicle sensing information, perform driving of the washer pump 300, and control the washer fluid located in a reservoir to be introduced into a washer fluid injector.

More preferably, the controller 200 moves the pipe assembly 120 along the case 110 so as to spray the washer fluid to the external device 500 to which cleaning is required. Most preferably, the controller 200 is configured to move the pipe assembly 120 along a rail 152 of a rail part 150 located inside the case 110. In addition, the controller 200 is configured to control a voltage applied to the motor assembly 130 located at a distal end of the case 110 so as to move the pipe assembly 120. The voltage applied to the motor assembly 130 is a pulse voltage. A time during which the pulse voltage is applied may be controlled according to a distance between the discharge holes 113. On the basis of an initial state, the number of times the pulse voltage is applied may be determined to correspond to the number of discharge holes 113 through which the pipe assembly 120 is moved.

When the cleaning request for the external device 500 is determined as receiving a malfunction condition or recognition accuracy that is less than or equal to a reference value through a sensor located in each device, the controller 200 may be controlled to automatically perform cleaning of a corresponding device or configured to perform cleaning in response to a direct input of the user.

The washer pump 300 configured in the reservoir 400 or at a position fluidically connected to the reservoir 400 is configured to pressurize the washer fluid introduced into the washer fluid distribution device 100. More preferably, the washer pump 300 may be configured to pressurize the washer fluid to have a pressure which allows a discharge portion 122 of the pipe assembly 120 to protrude above a fixing part 121. When the discharge portion 122 protrudes above the fixing part 121, it is configured such that the washer fluid introduced through a hose 140 is discharged through the discharge hole 113.

As described above, according to the present disclosure the washer fluid distribution device 100 is disclosed in which the controller 200 receives the cleaning request signal and controls a washer fluid pump and the motor assembly 130 on the basis of the received cleaning request signal to selectively distribute the washer fluid to the external device 500 to which cleaning is required.

Figure 2:
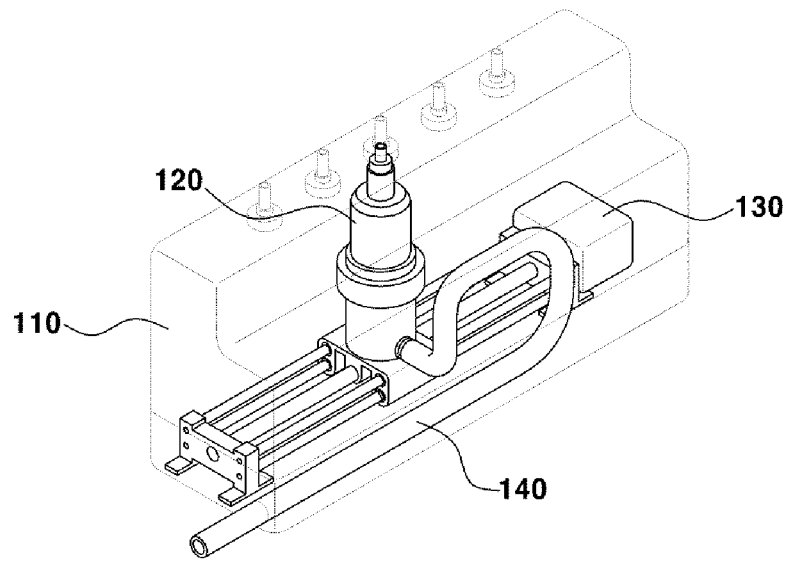
FIG. 2 is a perspective view illustrating the device for distributing a washer fluid according to one embodiment of the present disclosure.
Figure 3:
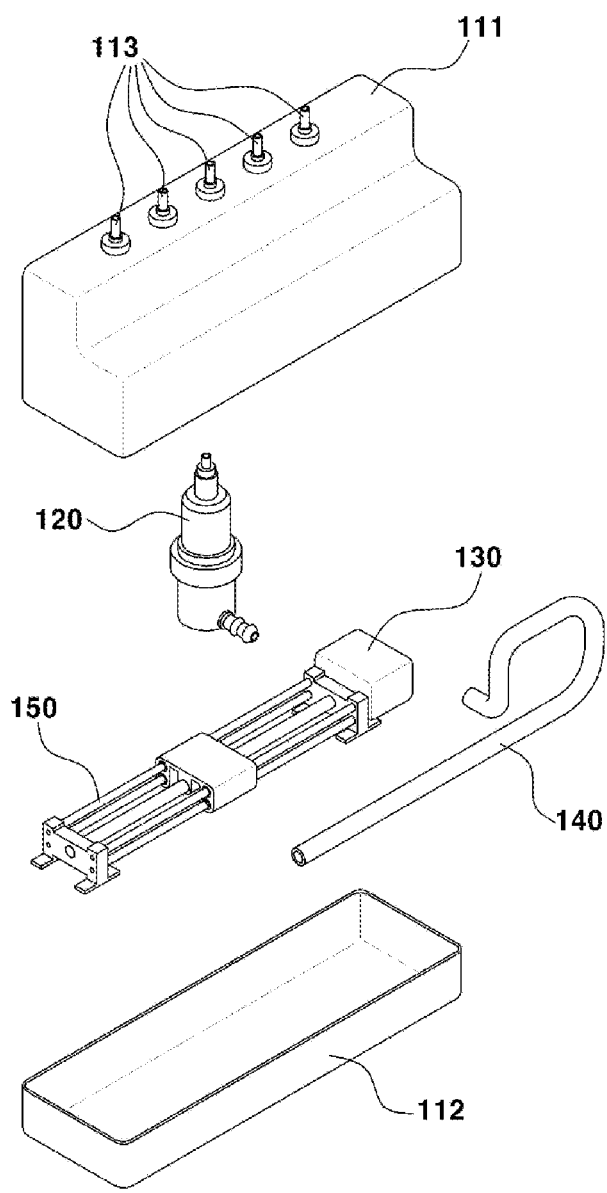
FIG. 3 is a part drawing illustrating the device for distributing a washer fluid according to one embodiment of the present disclosure.
Figure 4:
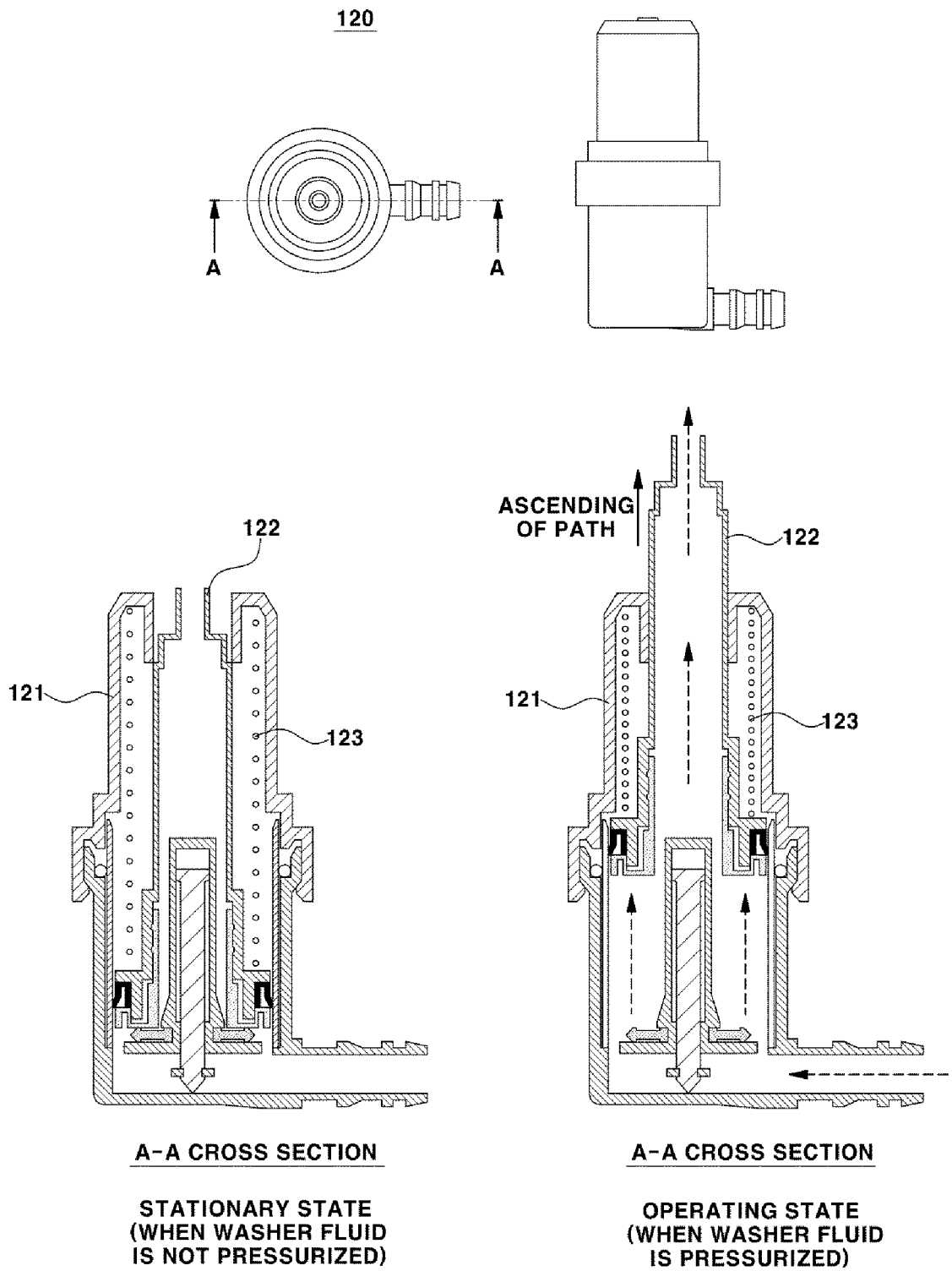
FIG. 4 is a cross-sectional view illustrating a pipe assembly according to one embodiment of the present disclosure.

FIGS. 2 and 3 illustrate a perspective view and a part drawing of the washer fluid distribution device 100 according to one embodiment of the present disclosure.

The washer fluid distribution device 100 according to the present disclosure includes an upper case 111 including one or more discharge holes 113, a lower case 112 corresponding to the upper case 111, a pipe assembly 120 configured to move along the rail part 150 located inside the lower case 112 and discharge a washer fluid through the one or more discharge holes 113, and the motor assembly 130 configured to apply a driving force so as to perform movement of the pipe assembly 120.

In addition, the pipe assembly 120 includes the hose 140 fluidically connected to the reservoir 400 and/or the washer pump 300 and configured to allow the washer fluid to be introduced into the pipe assembly 120. The hose 140 is configured to be moved simultaneously with the pipe assembly 120 on an upper surface of the rail part 150.

In response to a request of the external device 500 or an input of the user, the controller 200 is configured to control a duration and the number of times of the pulse voltage applied to the motor assembly 130. In one embodiment of the present disclosure, when the pulse voltage is applied once, the pipe assembly 120 is moved to a position corresponding to an adjacent discharge hole 113, and the number of times the pipe assembly 120 is moved to the discharge holes 113 is increased according to the number of times the pulse voltage is applied on the basis of the initial state. In addition, the duration (time) of the pulse voltage applied through the motor assembly 130 may be differently set according to a distance between the discharge holes 113 adjacent thereto.

More preferably, after the cleaning is completed, the controller 200 is configured to apply the pulse voltage of the motor assembly 130 to the pipe assembly 120 so as to switch the pipe assembly 120 to the initial state. The initial state means a case in which the pipe assembly 120 is located at the discharge hole 113 which is located closest to a position or a central portion corresponding to a discharge hole 113 which corresponds to the discharge hole 113 located at the central portion among the discharge holes 113 disposed in a length direction.

Therefore, after the cleaning is completed, the controller 200 is configured to apply a pulse voltage having opposite polarity through the motor assembly 130 to allow the pipe assembly 120 to be moved to the initial state.

The pipe assembly 120 is configured to be fixed to a sled 151 located on the rail part 150, and a lower surface of the sled 151 is configured to engage with a gear part 132 which is integrally rotated with a rotor of the motor assembly 130. More preferably, the gear part 132 rotated with the rotor of the motor assembly 130 may be formed as a rack gear which is located in a length direction of the rail part 150.

In addition, the lower surface of the sled 151 is configured such that the pipe assembly 120 is moved along the length direction of the rail part 150 due to a rotating force of the rack gear which includes a pinion gear and is integrally rotated with the rotor.

FIG. 3 is an enlarged view of the pipe assembly 120 that shows a side cross-sectional view illustrating a driving relationship between the initial state (stationary state) and an operating state.

The pipe assembly 120 includes the fixing part 121 fixed to the rail part 150 and the discharge portion 122 located inside the fixing part 121 and configured to protrude to be inserted into the discharge hole 113. More preferably, the fixing part 121 is configured to be engaged with the sled 151.

When the cleaning request is applied, the pipe assembly 120 is moved along the rail part 150, and thus it is configured such that the discharge portion 122 is inserted into the discharge hole 113 due to a hydraulic pressure of the washer fluid introduced along the hose 140, and thus the washer fluid is discharged through the discharge hole 113.

The fixing part 121 is formed in a cylindrical shape and includes a nipple so as to be fluidically connected to the hose 140. More preferably, the nipple engaged with the hose 140 is configured to be located on a side surface of the fixing part 121 capable of providing a hydraulic pressure to a rear surface of the discharge portion 122.

The discharge portion 122 is configured to be located inside the fixing part 121 and to move in a height direction. At least a portion of the discharge portion 122 is configured to protrude above the fixing part 121 due to the hydraulic pressure of the washer fluid introduced along the hose 140 and configured to allow the washer fluid introduced into the fixing part 121 to be discharged through the discharge hole 113.

When the hydraulic pressure is removed from the discharge portion 122 inserted into the discharge hole 113, an elastic member 123 is included between the fixing part 121 and the discharge portion 122 of the pipe assembly 120 so as to return the discharge portion 122 to an inner side of the fixing part 121.

The pipe assembly 120 is moved along the rail part 150 by the motor assembly 130 located at one end of the rail part 150. Therefore, in response to the cleaning request signal applied from the controller 200, the sled 151 engaged with the gear part 132 is moved, and the pipe assembly 120 fixed to the sled 151 is configured to be moved to a position corresponding to the discharge hole 113 connected to the external device 500. Thereafter, the discharge portion 122 is moved in the height direction of the fixing part 121 according to the hydraulic pressure of the washer fluid, and it is configured such that the washer fluid introduced through the fixing part 121 is sprayed through the discharge hole 113 to the external device 500 to which cleaning is requested.

In summary, the pipe assembly 120 is moved to a position corresponding to the discharge hole 113, which is fluidically connected to the external device 500 to which cleaning is requested, through the motor assembly 130. It is configured such that the washer fluid pressurized through the washer pump 300 is introduced into the pipe assembly 120 through the hose 140, and thus the discharge portion 122 is inserted into the discharge hole 113 so that the washer fluid introduced into the fixing part 121 is sprayed to the external device 500 through the discharge hole 113.

Figure 5:
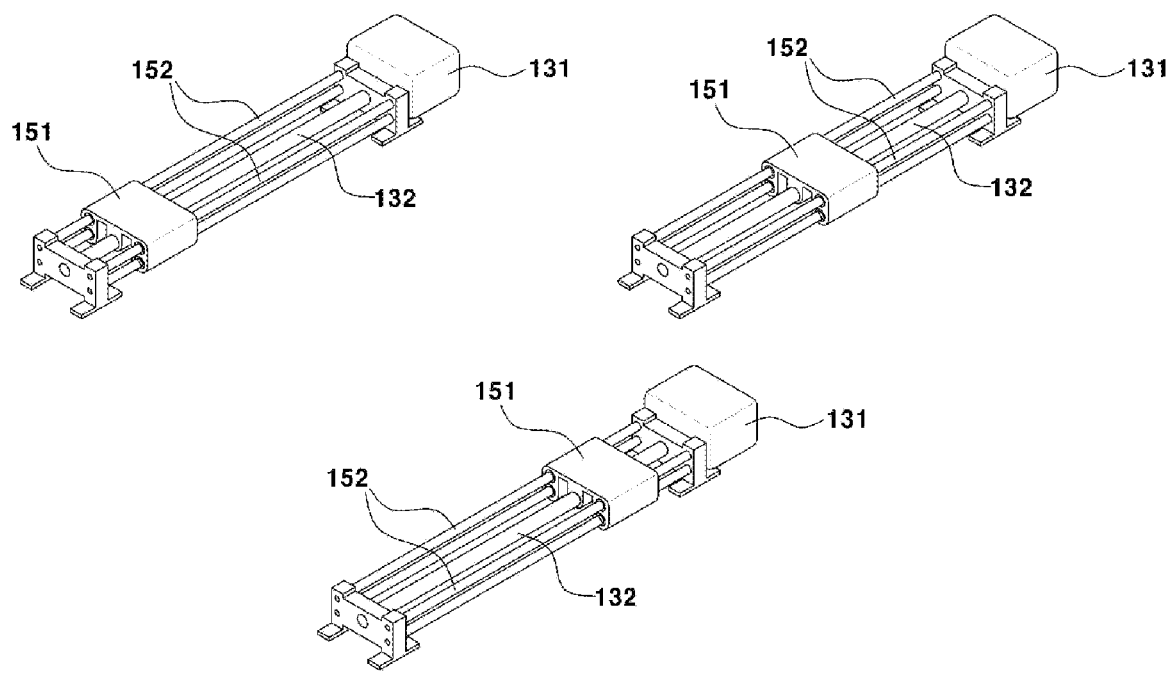
FIG. 5 is a diagram illustrating a coupling relationship between a motor assembly and a rail part according to one embodiment of the present disclosure.

FIG. 5 illustrates a coupling relationship between the motor assembly 130 and the rail part 150 according to one embodiment of the present disclosure.

The rail part 150 includes the rail 152 through which the pipe assembly 120 is moved, the sled 151 moved along the rail 152 and engaged with the fixing part 121 of the pipe assembly 120, and the pinion gear engaged to allow the sled 151 to be moved due to the driving force of the motor assembly 130.

The sled 151 includes one surface engaged with the pipe assembly 120 and is configured to surround at least a portion of the rail 152. More preferably, the rail 152 is formed as a two-row rail 152, and the sled 151 is configured to surround at least a portion of both side surfaces of the two-row rail 152 and to be moved in a length direction of the two-row rail 152.

A step motor 131 of the motor assembly 130 is configured to be located at one distal end of the two-row rail 152, and the gear part 132 integrally formed with the rotor of the step motor 131 is configured to be located along the two-row rail 152 in the length direction thereof to be engaged with the sled 151.

The sled 151 engaged with the gear part 132 of the motor assembly 130 includes a pinion gear located on the rear surface of the sled 151 engaged with the pipe assembly 120. More preferably, the gear part 132 is formed as a rack gear and is configured to be engaged with the sled 151 including the pinion gear.

The step motor 131 of the motor assembly 130 is configured to receive power applied due to the controller 200. It is configured such that pulse power is applied by corresponding to the discharge hole 113 and, in response to the pulse power, the pipe assembly 120 is moved to an adjacent discharge hole 113 close to an initial position.

In addition, when the pulse power is applied to the pipe assembly 120, the step motor 131 may be configured to rotate in both directions, and thus the pipe assembly 120 is configured to be moved to both discharge holes 113 adjacent to each other. Thus, the controller 200 is configured to control the number of times the pulse power is applied to the step motor 131 according to the number of discharge holes 113 between a discharge hole 113 to which cleaning is requested and a discharge hole 113 of an initial state.

In addition, in order to switch the pipe assembly 120 to the initial state in a state in which the cleaning is completed, the controller 200 is configured to re-apply a pulse voltage, and thus when the cleaning is completed, the pipe assembly 120 is configured to be switched to the initial state always.

The present disclosure can obtain the following effects according to a combination of the above-described embodiments and a configuration, which will be described below, and a use relationship.

In accordance with the present disclosure, a plurality of discharge holes are configured, and a pipe assembly is configured to be located at a selective position corresponding to each of the discharge holes so that there is an effect that a washer fluid can be sprayed to a plurality of branches through driving of a single washer pump.

In addition, in accordance with the present disclosure, a washer fluid distributor fluidically connected to a plurality of devices through the single washer pump can be provided such that there is an effect of improving maintenance of parts.

The foregoing detailed description illustrates the present disclosure. Further, the foregoing is intended to illustrate and describe the exemplary embodiments of the present disclosure, and the present disclosure may be used in various other combinations, modifications, and environments. That is, it is possible to practice alternations or modifications without departing from the scope of the present disclosure disclosed in this specification, equivalents, and/or within the technical or knowledge scope in the art to which the present disclosure pertains. The described embodiments are intended to illustrate the best mode for carrying out the technical spirit of the present disclosure and various modifications can be made in the specific applications and uses of the present disclosure. Therefore, the detailed description disclosed herein is not intended to limit the present disclosure as in the disclosed embodiments. Further, it should be construed that the appended claims are intended to include another embodiment.

What is claimed is:

1. A device for distributing washer fluid in a vehicle, the device comprising:
    a case including one or more discharge holes;
    a pipe assembly moved along the case and configured to discharge a washer fluid to the one or more discharge holes;
    a motor assembly configured to apply a driving force to allow the pipe assembly to be moved along the case;
    a hose engaged with the pipe assembly and integrally moved with the pipe assembly along the case; and
    a controller configured to control the driving force of the motor assembly in response to a cleaning request such that the pipe assembly discharges the washer fluid through a selected discharge hole,
    wherein in an initial state, the pipe assembly is provided at a position corresponding to a central discharge hole among the one or more discharge holes.

2. The device of claim 1, further comprising:
    a rail part located in the case,
    wherein the pipe assembly is configured to be moved along the rail part.

3. The device of claim 1, wherein the pipe assembly includes:
    a cylindrical structure fixed to the case;
    a discharge portion located inside the cylindrical structure and configured to protrude due to hydraulic pressure; and a compression spring located between the discharge portion and the cylindrical structure and configured to apply an elastic force to allow the protruding discharge portion to be restored.

4. The device of claim 2, wherein the motor assembly includes:
a step motor located at a distal end of the rail part; and
a gear part configured to transmit a rotating force of the step motor to allow the pipe assembly to be moved on the rail part.

5. The device of claim 1, wherein one end of the hose is configured to be fluidically connected to a washer pump.

6. The device of claim 2, wherein the rail part includes:
a sled to which the pipe assembly is fixed;
a pinion gear which is located on a lower surface of the sled and to which a driving force of the motor assembly is applied; and
a rail configured to move the pipe assembly.

* * * * *